(12) United States Patent
Hamada et al.

(10) Patent No.: US 6,469,848 B1
(45) Date of Patent: Oct. 22, 2002

(54) METHOD AND APPARATUS FOR MANUFACTURING A MAGNETIC RECORDING MEDIUM WITH PRE-FORMAT RECORDING SIGNALS TRANSFERRED AND RECORDED BY USING A MASTER INFORMATION CARRIER

(75) Inventors: Taizo Hamada, Osaka (JP); Hideyuki Hashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/720,119

(22) PCT Filed: Apr. 26, 2000

(86) PCT No.: PCT/JP00/02712

§ 371 (c)(1),
(2), (4) Date: Feb. 27, 2001

(87) PCT Pub. No.: WO00/65580

PCT Pub. Date: Nov. 2, 2000

(30) Foreign Application Priority Data

Apr. 27, 1999 (JP) ............................................. 11-120515

(51) Int. Cl.[7] ................................................. G11B 5/86
(52) U.S. Cl. ........................ 360/17; 360/16; 360/98.03; 369/72; 369/84
(58) Field of Search .............................. 360/16, 15, 17, 360/98.03, 97.03, 97.02, 98.02, 98.08, 55; 369/72, 84, 271, 258, 261

(56) References Cited

U.S. PATENT DOCUMENTS 4,367,547 A * 1/1983 Thigpen ...................... 369/271
4,376,963 A * 3/1983 Knoop et al. ................ 360/135
4,422,106 A * 12/1983 Sawasaki ...................... 360/17

FOREIGN PATENT DOCUMENTS

| JP | 7-78337 | 3/1995 |
|---|---|---|
| JP | 10-040544 | 3/1998 |
| JP | 10-162360 | 6/1998 |
| JP | 10-320768 | 12/1998 |
| JP | 11-25455 | 1/1999 |
| JP | 11-175973 | 7/1999 |
| JP | 11-296849 | 10/1999 |
| JP | 11-316944 | 11/1999 |
| JP | 2000-67433 | 3/2000 |
| JP | 2000-195046 | 7/2000 |
| JP | 2000-195047 | 7/2000 |
| JP | 2000-195048 | 7/2000 |

OTHER PUBLICATIONS

T. Yamaguchi, "Head–Positioning Servo Technology for Magnetic Disk Drives", Journal of Applied Magnetics Society of Japan, vol. 20, No. 3, pp. 771–776, 1996.

Y. Uematsu, "The Status & Future of Mechanical, Servo &HDI Technologies", The Applied Magnetics Society of Japan, 93rd Seminar, 93–5, pp. 35–42, 1996.

* cited by examiner

*Primary Examiner*—Alan T. Faber
(74) *Attorney, Agent, or Firm*—Wenderoth, Lind & Ponack, L.L.P.

(57) ABSTRACT

In the recording method of the present invention, the surface of a master information carrier facing a recording medium becomes slightly concave in its center when the master information carrier is placed upon and brought into tight contact with the recording medium, and information signals are transferred and recorded onto the recording medium. The recording method of the present invention can be widely used for producing disk-type recording media with a hole such as magnetic disks, photomagnetic disks and optical disks. The recording method of the present invention achieves quick and productive production of a very flat and smooth recording medium that is free of fine dust. Furthermore, high-density information signals can be recorded evenly and firmly on the whole surface of the magnetic surface of the magnetic recording medium.

42 Claims, 12 Drawing Sheets

METHOD AND APPARATUS FOR MANUFACTURING A MAGNETIC RECORDING MEDIUM WITH PRE-FORMAT RECORDING SIGNALS TRANSFERRED AND RECORDED BY USING A MASTER INFORMATION CARRIER

FIELD OF THE INVENTION

The present invention relates to a method of recording predetermined information signals onto a disk-type recording medium used for recording/reproducing apparatus such as hard disk drives.

BACKGROUND OF THE INVENTION

Recording density of magnetic recording/reproducing devices has been increasing to realize larger recording capacity in a smaller body. In the field of the hard disk drive which is a representative magnetic recording/reproducing device, devices with a recording density per square inch of more than 3 G bit/inch$^2$ (4.65 M bit/mm$^2$) have already been commercialized. The development of the technology is so quick that, in several years from now, devices with the recording density per square inch of 10 G bit/inch$^2$ (15.5 M bit/mm$^2$) will have been put on the market.

The key factor behind this trend of increasing recording density is tracking servo technology used in the recording/reproducing head. With the current tracking servo technology for the magnetic recording media, regions of tracking servo signals, address information signals and reproduction clock signals are provided on the magnetic recording media at intervals of predetermined degrees (hereinafter, pre-format recording). A magnetic head reproduces these signals at predetermined intervals to confirm and modify its position and scan tracks accurately (Yamaguchi: Head Positioning Servo Technology for Magnetic Disc Drives, Journal of the Applied Magnetics Society of Japan, Vol. 20, No.3 pp 771–776, 1996).

The tracking servo signals, the address information signals and the reproduction clock signals work as references signals so that the magnetic head can scan tracks accurately. As such, during the recording of the signals, precise positioning is required. Thus, conventionally, a magnetic recording medium is set in a servo recording device and the pre-format recording is made by a magnetic head whose position is strictly controlled (Uematsu et al: The Status & Future of Mechanical, Servo & HDI Technologies, the Applied Magnetics Society of Japan, 93rd Seminar, 93–5, pp35–42, 1996).

However, the conventional method for pre-format recording conducted with the servo recording device specially made for the purpose has the following problems.

First, since the recording conducted with the magnetic head is basically a linear recording determined by the relative movement of the magnetic head and the magnetic recording medium, it takes a long time to make the pre-format recording with the conventional method. Furthermore, the cost of the pre-format recording made with the conventional method is very high since the expensive servo recording device for pre-format recording is needed.

Second, due to the spacing between the head and the medium, and expansion of the recording magnetic field caused by the poling of the magnetic head, transition of magnetization at the ends of the tracks lacks steepness. Inadequate steepness in the transition of magnetization obstructs the achievement of an accurate tracking servo technology.

To solve the problem of the conventional method of the pre-format recording using the magnetic head, the following methods have been suggested.

The Japanese Patent Laid Open Publication No. H07-78337 discloses a method in which a master medium and a slave medium (the medium to be recorded upon) are brought into contact with each other, and with a press contact means made with an elastic body, are pressed and thoroughly contacted.

The Japanese Patent Laid Open Publication No. H10-40544 discloses a method for transferring magnetic patterns onto a magnetic recording medium in which a master information carrier is created by forming a magnetic section composed of ferromagnetic materials on the surface of a substrate in a pattern corresponding to the information signals. The magnetic pattern formed on the master information carrier in a manner corresponding to the information signals, is transferred and recorded on a magnetic recording medium. The information transfer and recording is conducted by bringing the surface of the master information carrier into contact with the surface of a sheet or disk-type magnetic recording medium on which a ferromagnetic thin film or a layer coated with ferromagnetic particles is formed, and applying a predetermined magnetic field.

In recent years, disk-type recording media such as magnetic disks, photomagnetic disks and optical disks have been improved so as to have larger storage capacities in a smaller and thinner body. Against this background, the demand for high density recording media as mentioned above, has been increasing. To meet such demand, highly precise, reliable disk-type recording media are needed. Thus, it is urgent to produce very flat and smooth disk-type recording media whose surfaces do not attract any fine dust during the recording of information.

With regard to the disk-type recording media to which predetermined information signals are magnetically transferred and recorded as mentioned above, the master information carrier and the disk-type recording medium must be in tight contact with each other during the information transferring process in the manufacturing of the magnetic disks in order to precisely transfer the information of the master information carrier. Japanese Patent Laid Open Publication No. H11-25455 discloses an art related to such magnetic information transfer with which the tightness of the connection between the disk-type media is improved. With the method disclosed in the Publication, however, disks are not connected tightly enough since the disk-type master information carrier is provided with a hole, and during the process of making a hole, fine dust is created and tightness of the connection is hampered.

Considering this situation, the present invention aims to provide a method which achieves a quick, productive, and stable recording of high density information signals onto magnetic recording media, especially disk-type recording media such as build-in-type hard disk media, removable hard disk media, and large capacity flexible media.

SUMMARY OF THE INVENTION

In the recording method of the present invention, a disk-type master information carrier with predetermined information signals formed thereon is placed on top of a disk-type recording medium, and the information signals formed on the master information carrier are transferred and recorded onto the recording medium. When the master information carrier is placed upon and brought into tight contact with the recording medium, the surface of the master information carrier facing the recording medium becomes slightly concave in its center.

DETAILED DESCRIPTION OF THE PREFERRED EMBODIMENTS

The manufacturing method of the present invention can be widely used for disk-type recording media with a hole such as magnetic disks, photomagnetic disks and optical disks. The present invention provides a very flat and smooth recording medium that is free of fine dust.

With the method of the present invention, the master information carrier is preferably composed of a silicon wafer. The silicon wafer can be used for general purposes, and as a material, it is easily processed and is superior in strength. Thus, very flat and smooth articles can easily be produced. Using the silicon wafer as the master information carrier and bringing it into tight contact with a disk-type recording medium such as a hard disk, a disk-type recording medium with superior flatness and smoothness can be manufactured.

As the contact of the two disks is very tight, the information signals can be transferred and recorded very accurately.

With the present invention, when the disk-type master information carrier and recording medium are separated from each other by stopping the suction of the master information carrier conducted for transferring the information, compressed air is sent between the master information carrier and the recording medium while pressing the master information carrier toward the recording medium side. After the master information carrier and the recording medium are separated, pressure applied on the master information carrier is released. Therefore, when separating the recording medium from the master information carrier after transferring the information signal, it will not remain stuck to the master information carrier and can easily be separated.

Further, according to the present invention, the pre-format recording is made on the disk-type magnetic recording medium, and then a magnetic recording/reproducing device is constructed using the medium.

As for the construction of a hard disk drive with a disk-type magnetic recording medium, the magnetic pattern used for pre-format recording is transferred and recorded onto the magnetic film of the disk-type magnetic recording medium, and then it is incorporated into a housing.

A preferred embodiment of the present invention is described hereinafter with reference to the accompanied drawings.

Figure 1:
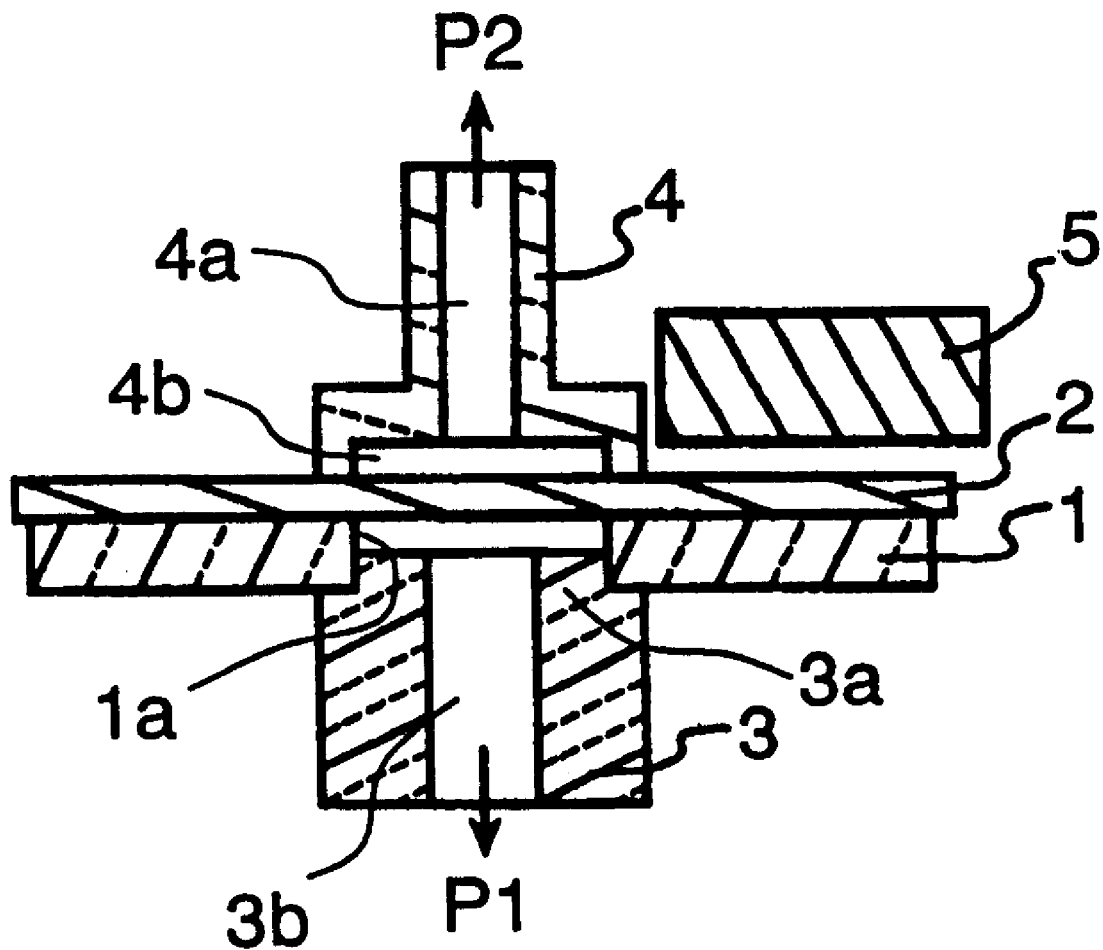
FIG. 1 shows a cross section of a device for carrying out the method of recording information to a magnetic recording medium in accordance with a preferred embodiment of the present invention.

FIG. 1 shows a cross section of a device for carrying out the method for recording information signal in accordance with the preferred embodiment of the present invention. In FIG. 1, a hard disk 1 which is a disk-type magnetic recording medium functioning as a slave disc, is a donut-shaped aluminum substrate with a hole 1a made in the center of the disk. A thin ferromagnetic layer composed of cobalt and other materials is deposited by sputtering on the surface of the hard disk 1.

A disk-type master information carrier 2 with no hole provided thereon is placed on top of the hard disk 1. The master information carrier 2 has a larger diameter than the hard disk 1. On the surface of the master information carrier 2 is a signal region composed of the ferromagnetic thin film deposited in such a manner that it forms fine patterns corresponding to the information signals to be magnetically transferred to the hard disk 1.

A chuck 3a which positions and holds the hard disk 1 is disposed at the top end of the spindle 3 functioning as a disk holder for the hard disk 1. Inside the spindle 3 is a suction hole 3b connected to a hole 1a of the hard disk 1. One end of the suction hole 3b is coupled to an exhaust duct (not illustrated). An exhaust device (not illustrated) is mounted on the end of the exhaust duct. When the exhaust device is started, negative pressure is applied in the space between the hard disk 1 and the master information carrier 2 through the exhaust duct and the suction hole 3b of the spindle 3. As a result, the master information carrier 2 is sucked in the direction of the hard disk 1, and positioned on top of it. At this moment, there is a slight gap between the hard disk 1 and the master information carrier 2, and through this gap, air is sucked from outside.

A suction pad 4 which functions as a supporting body of the master information carrier 2, is coupled approximately to the center of the master information carrier 2 and holds it in such a manner that its surface facing the hard disk 1 becomes slightly concave. The suction pad 4 has a suction hole 4a for sucking the master information carrier 2 and a recess 4b coupled to the suction hole 4a at the tip where the master information carrier 2 is attached. The inner diameter of the recess 4b at the tip of the suction pad 4 is set at almost the same diameter as that of the hole 1a of the hard disk 1.

The master information carrier 2 which is not provided with a hole, is sucked by the suction pad 4 and mounted on it. At this moment, a suction pressure P2 is set such that the internal pressure of the suction pad 4 is lower than the atmospheric pressure so that a concave is created almost at the center of the surface of the master information carrier 2 facing the hard disk 1. Thus, the master information carrier 2 becomes dished with the high point in its center in contact with the suction pad 4.

When a silicon wafer of 0.5 mm in thickness is used as the master information carrier 2 and is sucked at the pressure of 0.3–1 kg/cm$^2$, the master information carrier 2 becomes dished with the high point in its center in contact with the suction pad 4.

A magnetic head for magnetization 5 is for transferring and recording information signals from the master information carrier 2 onto the hard disk 1. Due to the magnetic field generated by the magnetic head 5, information signals are recorded on the hard disk 1 forming a magnetic pattern corresponding to the information signals formed on the master information carrier 2. The gap of the magnetic head 5 facing the master information carrier 2 forms an arc whose radius is the same as a tracking route of a recording/reproducing magnetic head. The surface of the magnetic head facing the master information carrier 2 has a sector-shape whose radius is the same as a tracking route of a recording/reproducing magnetic head. Thus, the direction of the magnetic field generated on the gap always crosses the tracking route at right angles, and all the tracks of the ferromagnetic thin film of the master information carrier 2 are magnetized in the direction crossing the tracking direction of the recording/reproducing magnetic head at right angles. In other words, the ferromagnetic thin film is magnetized in the same direction as the head gap direction of the recording/reproducing magnetic head.

The following is a description of one example of the master information carrier 2 used in the present invention.

Figure 2:
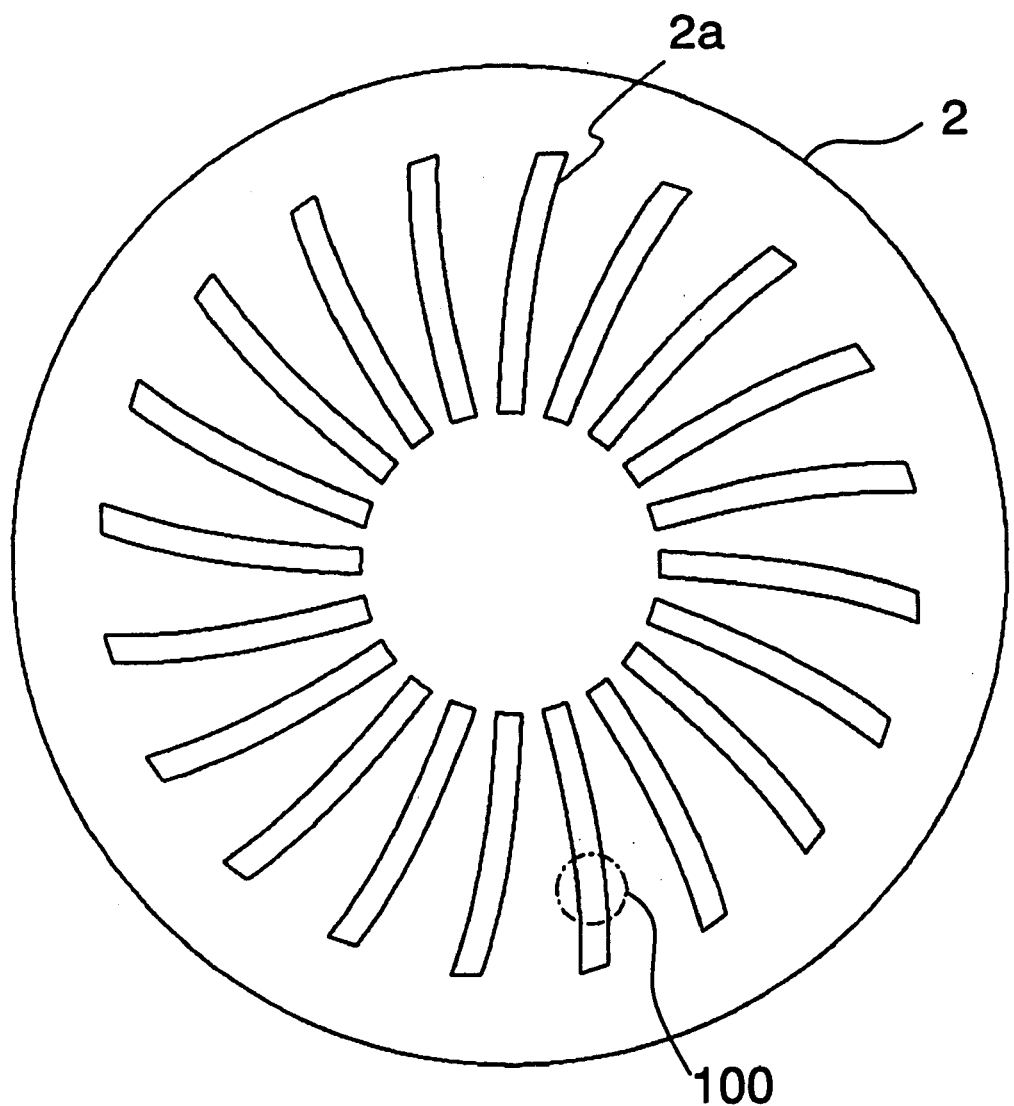
FIG. 2 shows a plan view illustrating one form of a master information carrier used in the recording method of the present invention.

FIG. 2 shows a plan view illustrating one form of a master information carrier 2. As shown in FIG. 2, on a main surface of the master information carrier 2, namely on the surface which contacts with the surface of the ferromagnetic thin film of the hard disk 1, the signal region 2a is radially formed.

Figure 3:
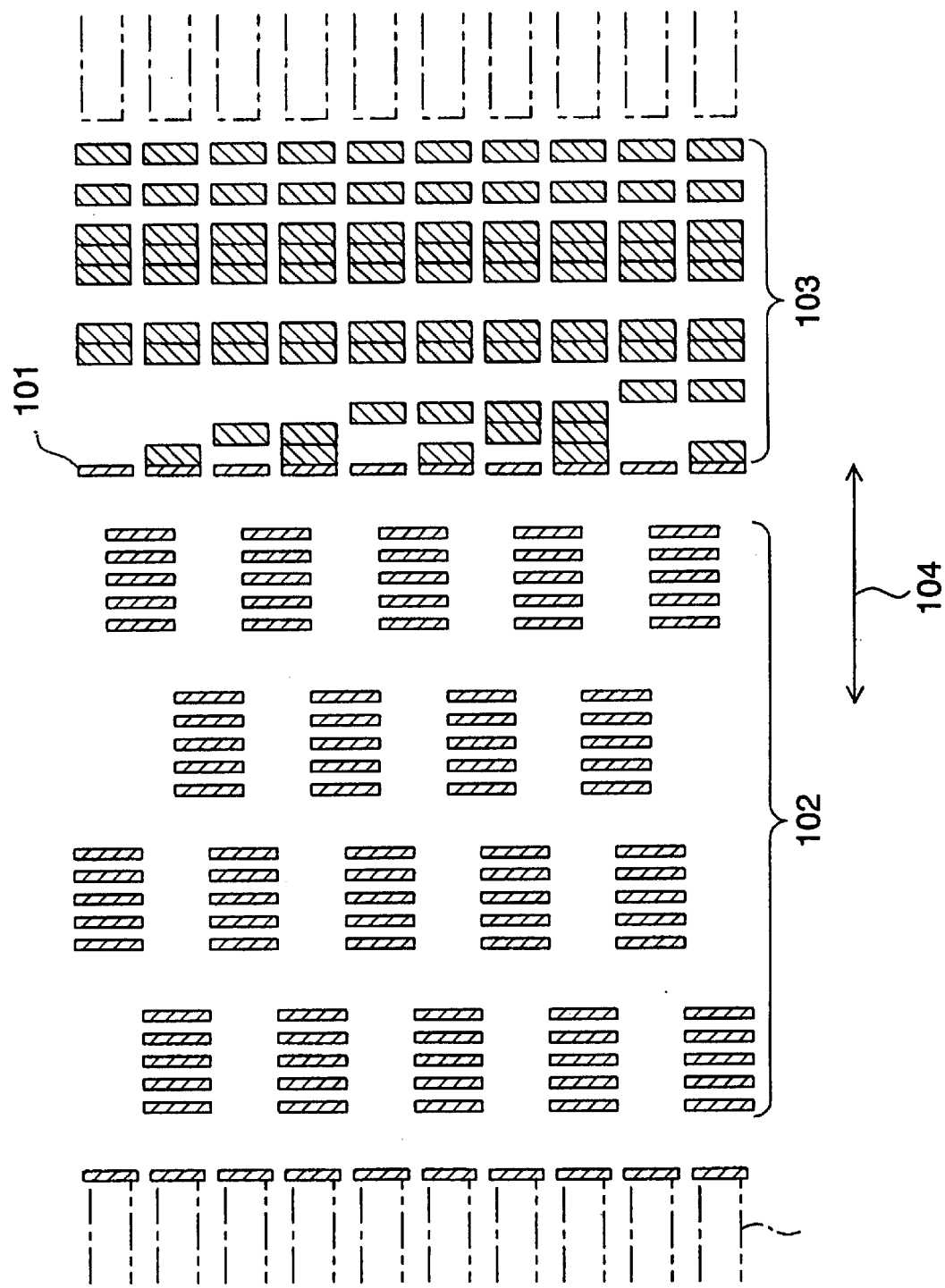
FIG. 3 shows a diagram of assistance in explaining one form of the array pattern of the information signals formed on the master information carrier.

FIG. 3 shows an enlarged view of a section 100 encircled by a dotted line in FIG. 2. As FIG. 3 shows, in the signal region 2a, a master information pattern made of the ferromagnetic thin film is formed in a pattern corresponding to digital information signals to be transferred and recorded (as pre-format recording, for example) onto a magnetic recording medium, in the position corresponding to the digital information signals. In FIG. 3, the hatched section is the magnetic section formed with the ferromagnetic thin film. The master information pattern shown in FIG. 3 comprises clock signals 101, servo signals for tracking 102, and address information signals 103 aligned in sequence in the direction of a tracking direction 104. The master information pattern shown in FIG. 3 is just an example, and according to the digital information signals to be recorded on the magnetic recording medium, the composition and alignment of the master information patterns are determined.

The following is an example in which only reference signals are recorded first on the magnetic film of a hard disk as in the case with the hard disk drive, and then according to the reference signals, pre-format recording of information signals such as the servo signals for tracking is recorded.

First, only reference signals which are used for the pre-format recording, are transferred and recorded on the magnetic film of the hard disk using the master information carrier 2. Then the hard disk is built into a housing of the hard disk drive, and the pre-format recording of information signals such as the servo signals for tracking is recorded using the magnetic head of the hard disk drive.

Figure 4:
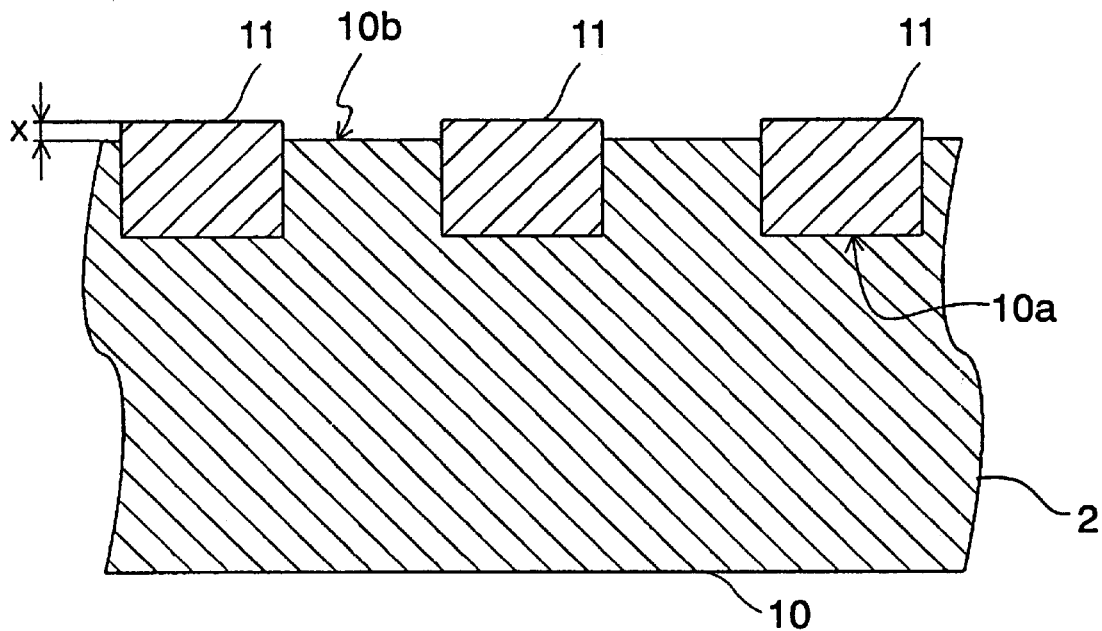
FIG. 4 shows a cross section illustrating one form of the master information carrier of the present invention.

FIG. 4 shows a partial cross section of the regions illustrated in FIGS. 2 and 3.

As FIG. 4 shows, the master information carrier 2 comprises a disk-type substrate 10 without a hole which is made of a non-magnetic material such as a silicon wafer (silicon substrate). On one main face of the substrate 10, namely on the surface in contact with the surface of the hard disk 1, are a plurality of recesses 10a formed in fine patterns corresponding to the information signals. The master information carrier 2 is constructed in such a manner that a ferromagnetic thin film 11 which is to function as a magnetic section, is imbedded in the recesses 10a.

As a material for the ferromagnetic thin film 11, a wide range of magnetic materials including hard, semi-hard and soft magnetic materials can be used. In other words, any material is acceptable providing that the material allows the ferromagnetic thin film 11 to transfer and record digital information signals on the magnetic recording medium. For example, iron, cobalt and iron-cobalt alloy can be used as a material.

To generate a magnetic field sufficient for any kind of magnetic recording media on which the information of the master information carrier is recorded, it is desirable to use the magnetic material with a saturation flux density as large as possible. With the magnetic disks with coercive force over 2000 Oe and flexible disks with a thick magnetic layer, when the saturation flux density is lower than 0.8 tesla, recording may not be conducted satisfactorily. Therefore, normally a magnetic material with a saturation flux density of 0.8 tesla or greater, and desirably, 1.0 tesla or greater is used.

The thickness of the ferromagnetic thin film changes depending on the length of one bit, the saturation magnetization of the magnetic recording medium and thickness of the magnetic layer. For example, when the bit length is about 1 $\mu$m, the saturation magnetization of the magnetic recording medium is about 500 emu/cc, and the thickness of the magnetic layer of the magnetic recording medium is about 20 nm, the thickness of the ferromagnetic thin film 11 can be ca 50 nm–500 nm.

The method of manufacturing the master information carrier is described hereinafter.

The master information carrier used in the recording method of the present invention is produced in the following processes. First, a resist film is formed on the surface of the Si substrate, and patterns are made on the resist film by laser beam photolithography or electron beam lithography. Second, the Si substrate is etched by dry etching to form fine concave structures corresponding to the information signals. Third, the ferromagnetic thin film made of cobalt or other materials is formed by sputtering, a vacuum deposition method, ion plating, a CVD method or plating. Then the ferromagnetic thin film formed on the resist film is removed in a lift-off process. With the above-mentioned processes, the master information carrier 2 with the magnetic sections which has ferromagnetic thin film imbedded in the recesses thereof and corresponds to the information signals, is obtained.

The method of forming a concave structure on the surface of the master information carrier is not limited to the foregoing method. It can be formed directly and finely using a laser, an electron beam or an ion beam, or by machining.

The following is a description of the recording processes of the information signals corresponding to the patterns formed onto the master information carrier 2 on a hard disk which is a disk-type magnetic recording medium.

Figure 5:
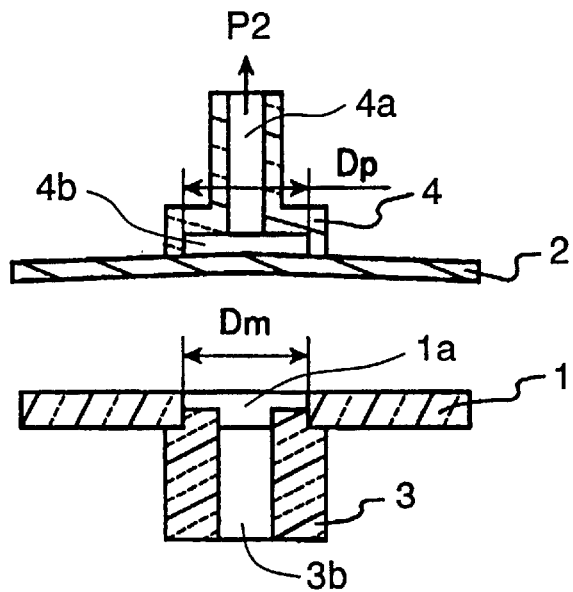
FIG. 5 shows a cross section illustrating a main process of the recording method of the present invention.

First, as FIG. 5 shows, the disk-type master information carrier is sucked by the recess 4b disposed at the tip of the suction pad 4 at the suction pressure P2. At this moment, the master information carrier 2 is held such that it is made concave in its center in contact with the suction pad 4.

Subsequently, the master information carrier 2 fixed to the suction pad 1 is brought to the vicinity of the hard disk 1 (a slave disk) which is attached to a spindle 3. When a magnetic disk with an inner diameter (Dm) of 25 mm, and outer diameter of 95 mm, is used as the hard disk 1, the appropriate outer diameter of the master information carrier 2 is around 100 mm. The inner diameter of the tip of the suction pad 4, namely the inner diameter of the recess 4b (Dp), is desirably almost the same as the diameter of the central hole of the hard disk 1. The present invention can be used for disks of a variety of sizes; however, the outer diameter of the master information carrier 2 is desirably slightly larger than that of the hard disk 1 (a slave disk).

Figure 6:
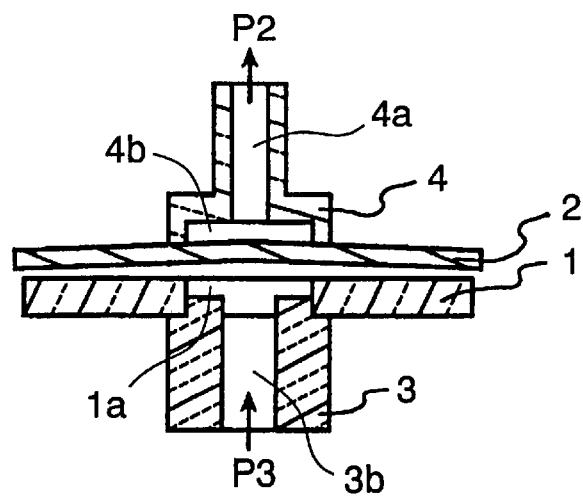
FIG. 6 shows a cross section illustrating a main process of the recording method of the present invention.

As FIG. 6 shows, after bringing the two disks close to each other, compressed air is blown through a suction hole 3a of the spindle 3 to remove fine dust attached to the surfaces of both disks facing each other and to clean them. The pressure of the air (P3) blown through the suction hole 3a is preferably within 0.3–1 $kg/cm^2$.

In this process, fine dust can be removed; however, extremely fine dust under 1μm may remain. Among such extremely fine dust, the dust which is attached to the hard disk 1, is completely removed from the hard disk 1 in the following process when the master information carrier 2 and the hard disk 1 are separated from each other after being brought into contact tightly.

When fine dust is removed, blowing of the air is stopped, and then the master information carrier 2 and the hard disk 1 are brought into firm contact. Subsequently, as FIG. 1 shows, the spindle 3 sucks the master information carrier 2 at the pressure by which the curvature of the master information carrier 2 returns to being flat. At this moment, by equalizing a suction pressure P1 of the spindle 3 and a suction pressure P2 of the suction pad 1, the curvature of the master information carrier 2 disappears making it a flat disk-type carrier. Thus the hard disk 1 which is a slave disk and the master information carrier 2 are tightly contacted.

Figure 8:
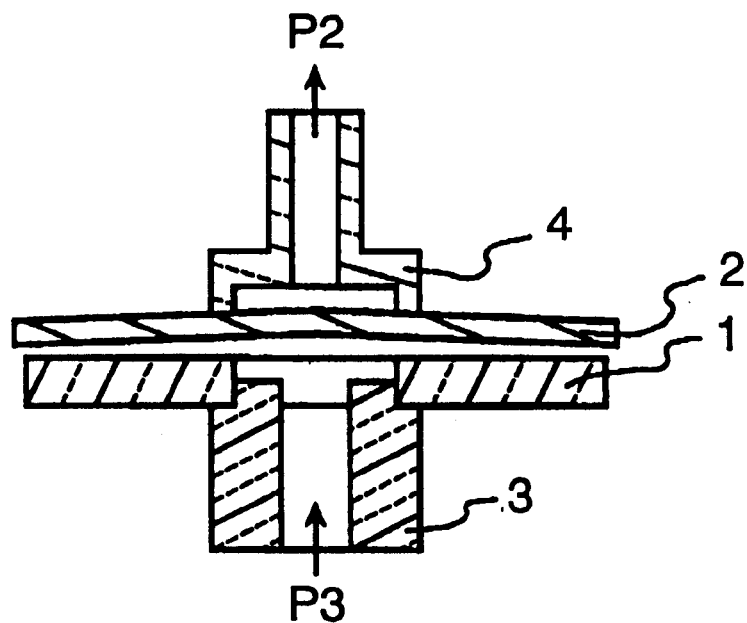
FIG. 8 shows a cross section illustrating a main process of the recording method of the present invention.
Figure 9:
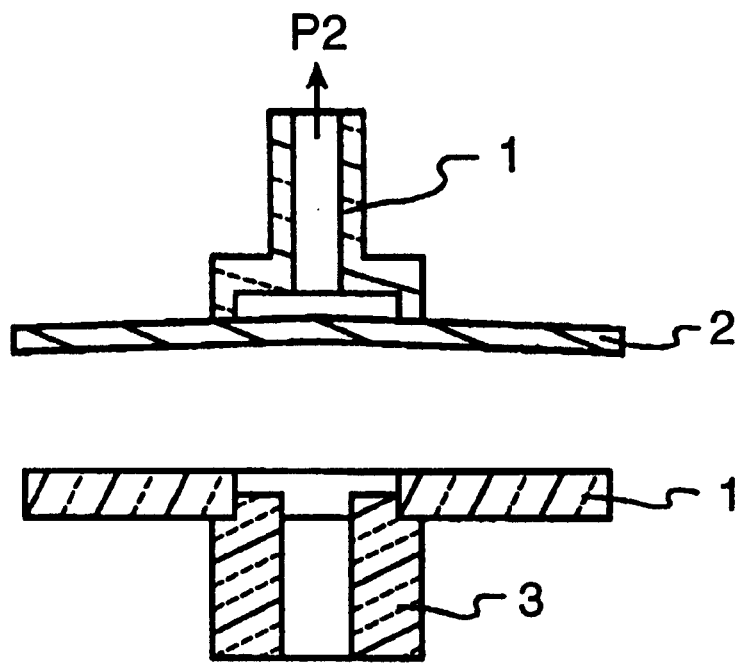
FIG. 9 shows a cross section illustrating a main process of the recording method of the present invention.

Subsequently, while maintaining the tight contact between the master information carrier 2 and the hard disk 1, the transferring magnetic field is applied by a magnetic head 5 to transfer the information signals of the master information carrier 2 to the hard disk 1. The spindle 3 stops sucking. Conversely, then air at the pressure P4 is applied through the spindle 3 as shown in FIG. 8, and the two disks are separated from each other as shown in FIG. 9. Appropriate air pressure P4 of the air being sent into the spindle 3 is preferably within the range of 0.3~1 $kg/cm^2$.

The following is a description of the method for transferring and recording the information signals of the master information carrier 2 onto the hard disk 1 by applying a transferring magnetic field using the magnetic head 5.

Figure 10:
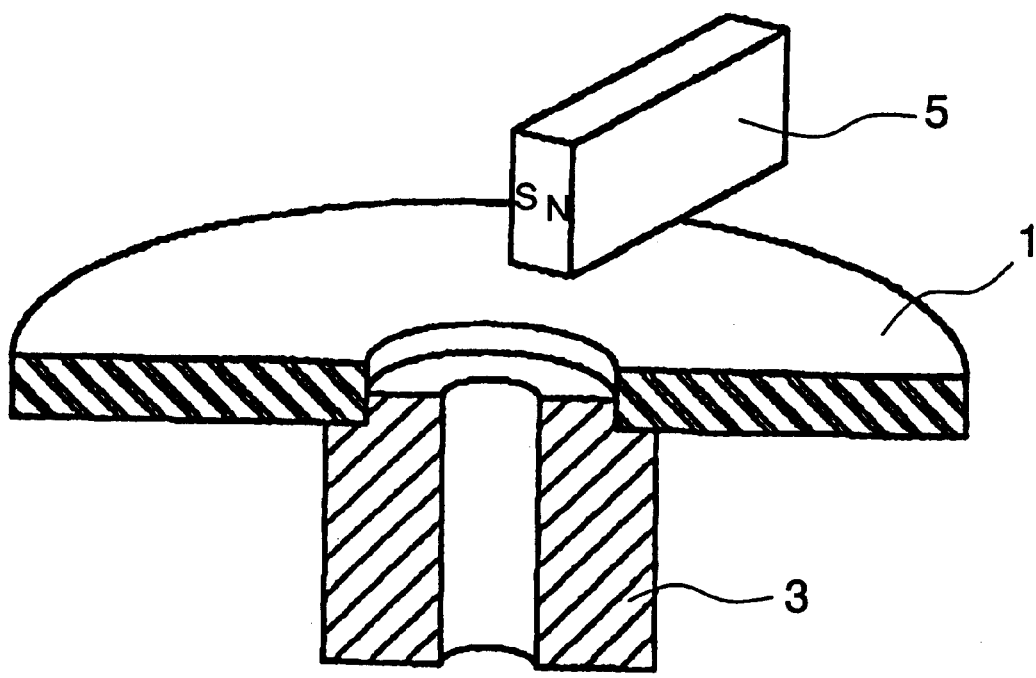
FIG. 10 shows a perspective view illustrating a situation in which a magnetic field is applied to a hard disk in one direction in accordance with the recording method of the present invention.
Figure 11:
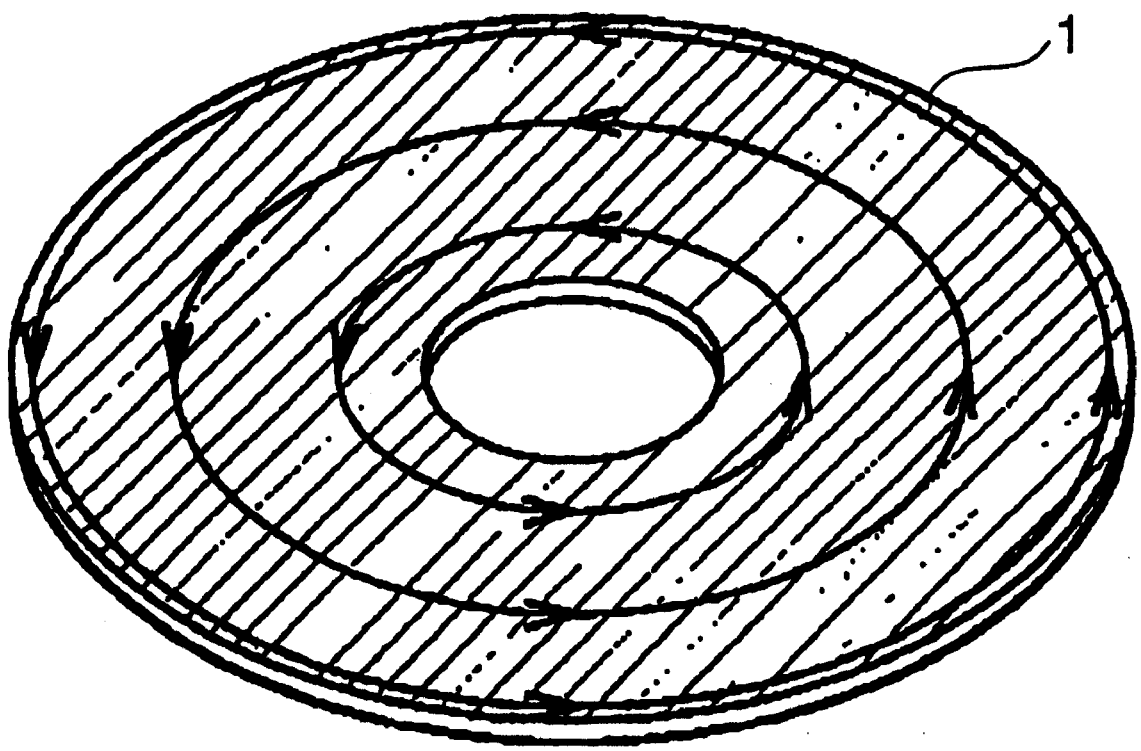
FIG. 11 shows a perspective view schematically illustrating the hard disk magnetized in one direction in the process shown in FIG. 10.

First, as FIG. 10 shows, the magnetic head 5 is kept close to the hard disk 1 and is turned parallel to the hard disk 1 with its central axis functioning as a rotation axis in order to magnetize the hard disk 1 in one direction as pointed out by arrows in FIG. 11 (initial magnetization).

Figure 12:
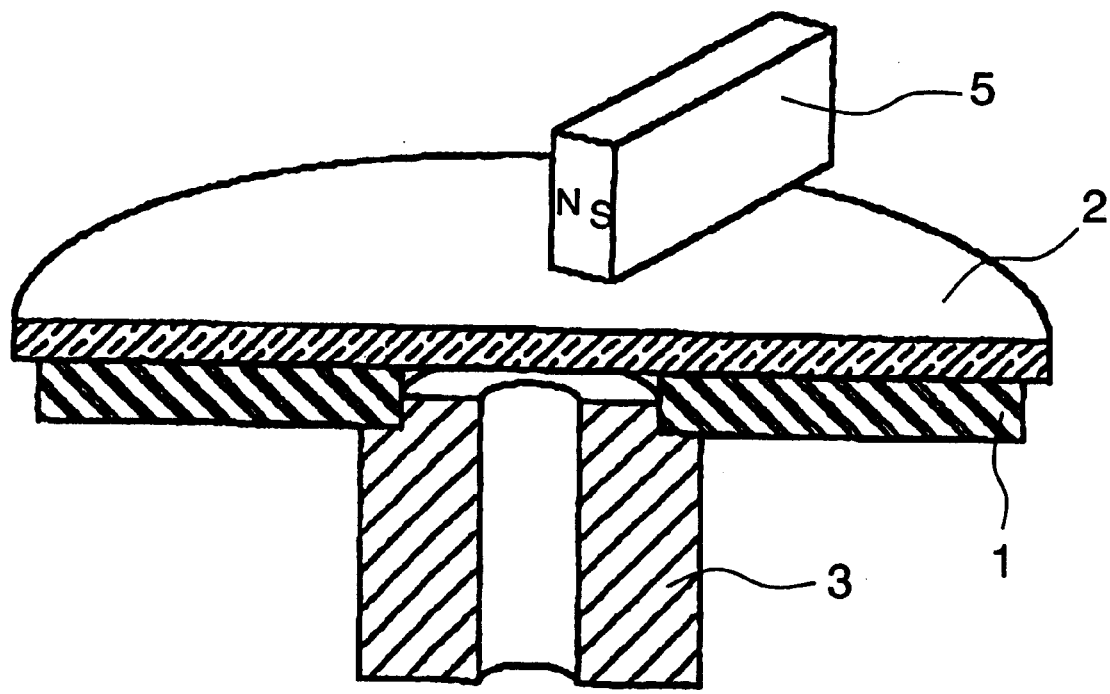
FIG. 12 shows a perspective view illustrating a situation in which information signals are transferred and recorded onto a hard disk in accordance with the recording method of the present invention.
Figure 13:
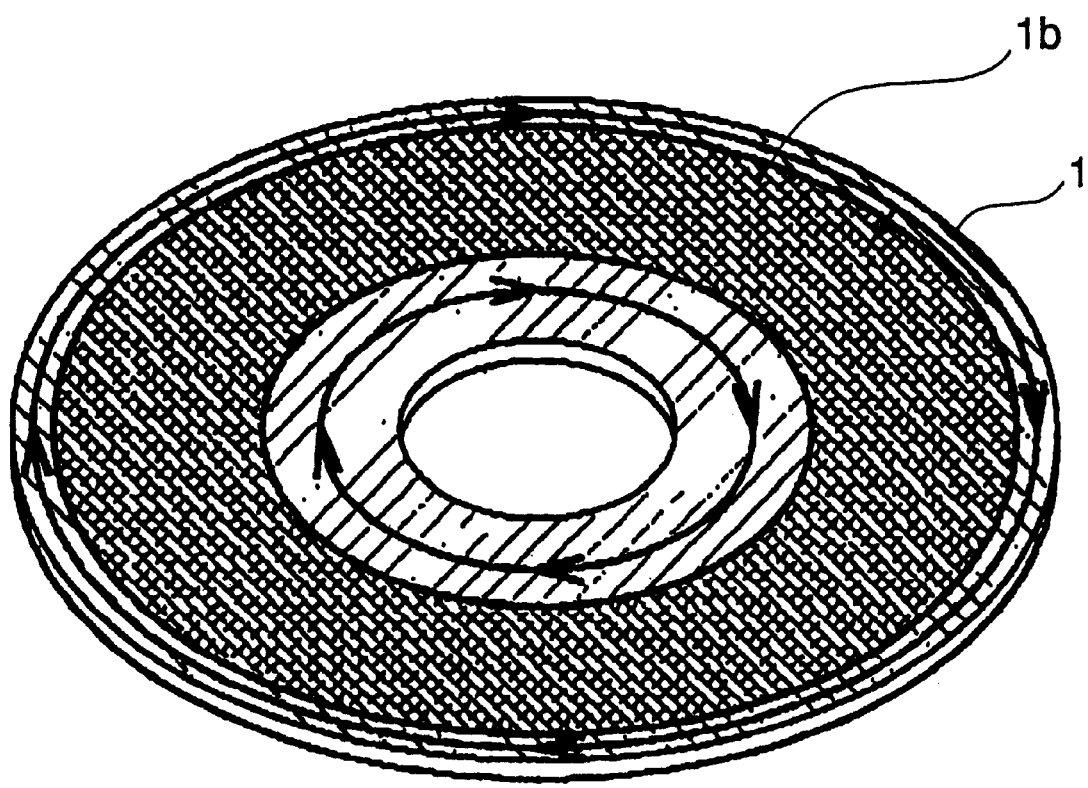
FIG. 13 shows a perspective view schematically illustrating the hard disk with information signals recorded thereon in the process shown in FIG. 12.

Next, as FIG. 1 shows, the master information carrier 2 is brought to the predetermined position over the hard disk 1, and the surface of the master information carrier 2 where the thin ferromagnetic layer 11 is formed and the hard disk 1 are brought into close contact. As FIG. 12 shows, the direction of the current applied to the magnetic head 5 is reversed so that the magnetic field generated by the magnetic head 5 occurs in the opposite direction to the initial magnetization. The magnetic head 5 is rotating in a plane parallel to the master information carrier 2 with a center of rotation lined up with the center of hard disk 1, and a DC magnetic field is applied on the master information carrier 2. This magnetizes the ferromagnetic thin film of the master information carrier 2. Then as shown in FIG. 13, the information signals corresponding to the patterns in the magnetic section made of the ferromagnetic thin film 11 are recorded on a predetermined region 1b of the hard disk 1 placed on top of the master information carrier 2. Arrows in FIG. 13 show the direction of the magnetic field of the magnetic pattern to be transferred and recorded on the hard disk 1.

Figure 14:
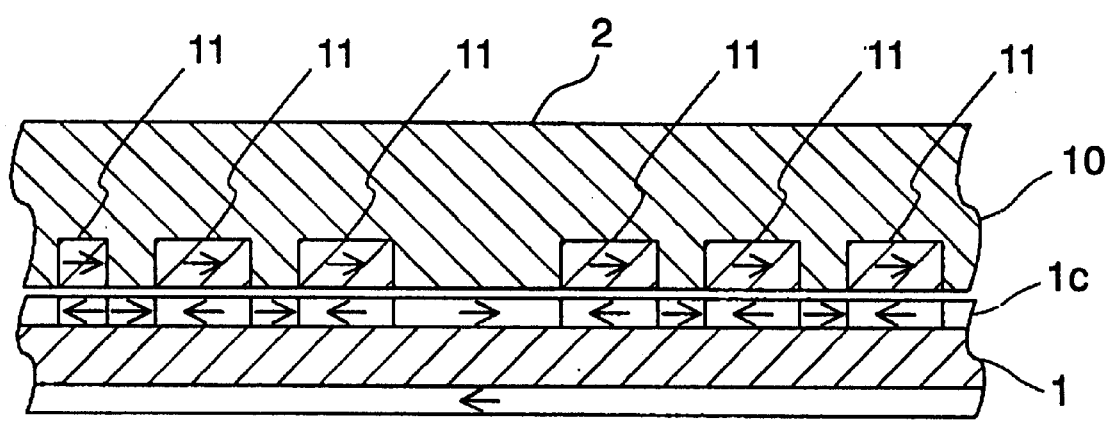
FIG. 14 shows a diagram of assistance in explaining magnetic pattern when the information signals are transferred and recorded on the hard disk in the process shown in FIG. 12.

FIG. 14 shows the condition during the magnetization. As FIG. 14 shows, while maintaining the master information carrier 2 in tight contact with the hard disk 1, a magnetic field is applied onto the master information carrier 2 to magnetize the ferromagnetic thin film 11. As has been described, the information signals can be recorded on a magnetic recording layer 1c made of the ferromagnetic thin film of the hard disk 1. In other words, by using the master information carrier 2 which is constructed in such a manner that the ferromagnetic thin film is formed in the predetermined array pattern on the non-magnetic substrate 10, digital information signals can be magnetically transferred and recorded onto the hard disk 1.

Applying the external magnetic field while maintaining the close contact between the master information carrier 2 and the hard disk 1 is not the only method to transfer and record the pattern of the master information carrier 2 onto the hard disk 1. As another method, the ferromagnetic thin film 11 of the master information carrier 2 can be magnetized in advance and brought into tight contact with the hard disk 1. The digital information signals can be recorded onto the hard disk 1 by this method as well.

In the methods of transferring and recording the information from the master information carrier to the magnetic recording medium such as the one disclosed in the present invention, the master information carrier is provided beforehand with a magnetic section made of a ferromagnetic thin film formed in a pattern corresponding to the digital information signals to be recorded onto the magnetic recording medium. The master information carrier is brought into contact with the magnetic recording medium to transfer the array pattern formed on the master information carrier as magnetic patterns. Thus, it is important to transfer the information as the magnetic patterns corresponding to the array patterns in the magnetic section formed on the master information carrier as reliably and precisely as possible.

The master information carrier 2 used in the present invention does not have a hole. Since the master information carrier 2 without a hole is used, the process of making a hole on the master information carrier 2 is omitted. Therefore, when it is used to transfer the information, productivity of the disk-type magnetic recording medium is improved.

Figure 15:
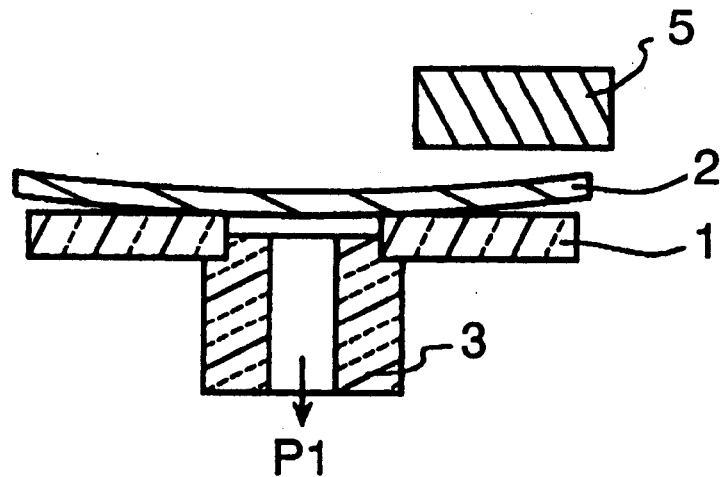
FIG. 15 shows a cross section illustrating the transferring process conducted without utilizing the method of the present invention.
Figure 16:
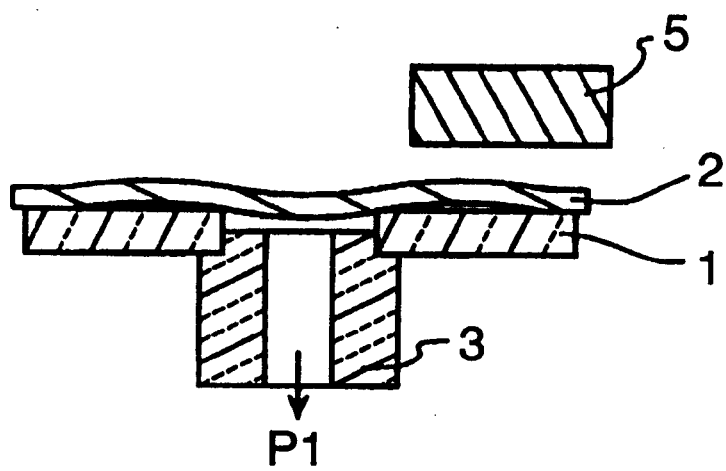
FIG. 16 shows a cross section illustrating the transferring process conducted without utilizing the method of the present invention.

If the master information carrier 2 is not flat, then if it is sucked by the spindle 3 when bringing the master disk into tight contact with the disk-type magnetic recording medium to transfer information, a gap can be created between the hard disk 1 (a slave disk) and the master information carrier 2 at its periphery as shown in FIG. 15 or at any other point on its surface. When such gap is created, the information of the master information carrier 2 may fail to be transferred precisely and evenly onto the hard disk 1.

Figure 7:
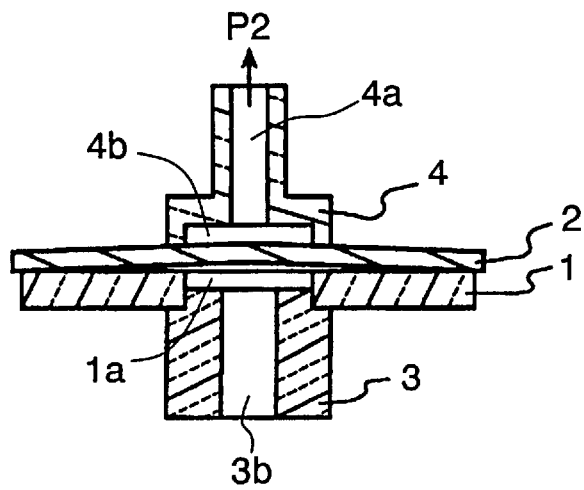
FIG. 7 shows a cross section illustrating a main process of the recording method of the present invention.

In the method of the present invention, the suction pad 4 sucks approximately the center of the master information carrier 2 making it slightly concave in its center. Due to this, when the two disks are brought into contact, as FIG. 7 shows, a space is created between the disks in such a manner that the widest gap is formed at the center of the disks while their peripheries are in contact. Then when the spindle 3 sucks and flattens the master information carrier 2, the two disks come into tight contact without leaving any space between them. By this construction, the information signals of the master information carrier 2 can be transferred precisely and evenly on the whole surface of the hard disk 1 which is a slave disk.

According to the method of the present invention, contact between the hard disk 1 (a slave disk) and the master information carrier 2 improves. Thus, a slave disk with superior flatness and smoothness and free from dust can be produced.

With the following preferred embodiment, one example of the manufacturing condition is described.

EXAMPLE 1

A silicon wafer of 100 mm in outer diameter and 0.525 mm in thickness, having information signals recorded thereon is used as the master information carrier, and a magnetic hard disk medium (3.5 inch hard disk) of 95 mm in outer diameter, 25 mm in inner diameter, and 0.8 mm in thickness is used as a slave disk, and information signals are transferred from the master information carrier to the magnetic disk. The inner diameter Dp of the suction pad is the same as the inner diameter of the slave disk at 25 mm, and suction pressure P2 is set at 0.8 kg/cm$^2$.

Air pressure P3 to be sent to the spindle is set at 0.6 kg/cm$^2$ as shown in FIG. 6. The pressure P1 shown in FIG. 4 is set at the same suction pressure as the pressure P2. In FIG. 5, the air pressure P4 to be sent to the spindle is set at 0.6 kg/cm$^2$.

With the above-mentioned condition, the magnetic hard disk medium does not have any dropout of the information. Furthermore, the surface of the magnetic disk is free from any scratches caused by dust left in between the surfaces.

In the present embodiment, air was used to clean or to press the master information carrier and the slave disks, but it is obvious another gas such as nitrogen, argon and the like can be used.

According to the investigation on the surface of the slave disk conducted after the transfer of the information signals with laser-Doppler type disk test equipment which can precisely measure at the level of 10 nm, there is no presence of dust or damage caused by dust.

Industrial Applicability

As previously mentioned, according to the present invention, a disk with a very flat, smooth and clean surface can be produced. According further to the present invention, the information of the master information carrier can be precisely transferred to the slave disk during the transfer process of the information signals from the master information carrier to the disk-type recording medium (a slave disk). Especially according to the present invention, in the transferring process of the information signals to the magnetic disk which are used in hard disk devices and floppy disk devices, the master information carrier and the slave disks are brought into contact very tightly without leaving any space gap. Thus the high-density information signals can be recorded evenly and firmly onto the whole surface of the magnetic recording medium. Thus a highly precise and reliable disk can be obtained.

What is claimed is:

1. A method for manufacturing a magnetic recording medium, said method comprising:

producing a master information carrier by forming a magnetic section made of a ferromagnetic thin film on a disk-type substrate in a pattern corresponding to a information signal;

stacking the master information carrier on the magnetic recording medium; and transferring and recording the pattern corresponding to the information signal as a magnetic pattern by magnetizing the magnetic section;

wherein during said stacking the master information carrier on the magnetic recording medium, the master information carrier is stacked on the magnetic recording medium such that a surface of the master information carrier facing the magnetic recording medium is dished to be concave, and then is brought into tight contact with the magnetic recording medium.

2. A method for manufacturing a magnetic recording medium, said method comprising:

producing a master information carrier by forming a magnetic section made of a ferromagnetic thin film on a disk-type substrate in a pattern corresponding to an information signal;

stacking the master information carrier on the magnetic recording medium; and transferring and recording the pattern corresponding to the information signal as a magnetic pattern by magnetizing the magnetic section;

wherein during said stacking the master information carrier on the magnetic recording medium, the master information carrier is stacked on the magnetic recording medium such that a surface of the master information carrier facing the magnetic recording medium is dished to be concave, and surfaces of the master information carrier and the magnetic recording medium are cleaned by gas compressed and blown in between the master information carrier and the magnetic recording medium.

3. The method for manufacturing a magnetic recording medium as defined in claim 1, wherein during said stacking the master information carrier on the magnetic recording medium, the master information carrier is brought into tight contact with the magnetic recording medium while negative pressure is applied in an air space between the magnetic recording medium and the master information carrier by using an exhaust device and the master information carrier is subjected to suction at a level of pressure at which the concave surface of the master information carrier becomes flat.

4. The method for manufacturing a magnetic recording medium as defined in claim 3, wherein said stacking the master information carrier on the magnetic recording medium further comprises cleaning the surfaces of the master information carrier and the magnetic recording medium by gas compressed and blown in between the master information carrier and the magnetic recording medium while the surface of the master information carrier is concave.

5. The method for manufacturing a magnetic recording medium as defined in claim 3, wherein after said transferring and recording, the suction is stopped in order to separate the master information carrier and the magnetic recording medium.

6. The method for manufacturing a magnetic recording medium as defined in claim 4, wherein after said transferring and recording, the suction is stopped to separate the master information carrier and the magnetic recording medium.

7. The method for manufacturing a magnetic recording medium as defined in claim 5, wherein upon separating the master information carrier and the magnetic recording medium, gas is compressed and blown in between the master information carrier and the magnetic recording medium.

8. The method for manufacturing a magnetic recording medium as defined in claim 5, wherein upon separating the master information carrier and the magnetic recording medium, gas is compressed and blown in between the master information carrier and the magnetic recording medium while pressing the master information carrier toward the magnetic recording medium, and after the separation, said pressing is released.

9. The method for manufacturing a magnetic recording medium as defined in claim 1, wherein the master information carrier is subjected to suction and held by a master information carrier holder having a suction hole and a recess, wherein an inner diameter of the recess is almost the same as a diameter of a central hole of the magnetic recording medium.

10. A method for manufacturing a disk-type recording medium, said method comprising:
    forming a predetermined information signal on a master information carrier;
    stacking the master information carrier on the disk-type recording medium; and
    transferring and recording the information signal formed on the master information carrier onto the disk-type recording medium;
    wherein during said stacking the master information carrier on the disk-type recording medium, the master information carrier is stacked on the disk-type recording medium such that a surface of the master information carrier facing the magnetic recording medium is dished to be concave, and then is brought into tight contact with the disk-type recording medium.

11. A method for manufacturing a disk-type recording medium, said method comprising:
    forming a predetermined information signal on a master information carrier;
    stacking the master information carrier on the disk-type recording medium; and
    transferring and recording the information signal formed on the master information carrier onto the disk-type recording medium;
    wherein during said stacking the master information carrier on the disk-type recording medium, the master information carrier is stacked on the magnetic recording medium such that a surface of the master information carrier facing the magnetic recording medium is dished to be concave, and surfaces of the master information carrier and the disk-type recording medium are cleaned by gas compressed and blown in between the master information carrier and the disk-type recording medium.

12. The method for manufacturing a disk-type recording medium as defined in claim 10, wherein during said stacking the master information carrier on the disk-type recording medium, the master information carrier is brought into tight contact with the disk-type magnetic recording medium while negative pressure is applied in an air space between the magnetic recording medium and the master information carrier by using an exhaust device and the master information carrier is subjected to suction at a level of pressure at which the concave surface of the master information carrier becomes flat.

13. The method for manufacturing a disk-type recording medium as defined in claim 12, wherein during said stacking the master information carrier on the disk-type recording medium, surfaces of the master information carrier and the disk-type recording medium are cleaned by gas compressed and blown in between the master information carrier and the disk-type recording medium while the surface of the master information carrier is dished to be concave.

14. The method for manufacturing a disk-type recording medium as defined in claim 12, wherein after said transferring and recording the information signals, the suction is stopped to separate the master information carrier and the disk-type recording medium.

15. The method for manufacturing a disk-type recording medium as defined in claim 13, wherein after said transferring and recording the information signals, the suction is stopped in order to separate the master information carrier and the disk-type recording medium.

16. The method for manufacturing a disk-type recording medium as defined in claim 1, wherein the master information carrier is a disk with no hole made thereon.

17. The method for manufacturing a disk-type recording medium as defined in claim 1, wherein the master information carrier is made of a silicon wafer.

18. The method for manufacturing a disk-type recording medium as defined in claim 14, wherein upon separating the master information carrier and the disk-type recording medium, gas is compressed and blown in between the master information carrier and the disk-type recording medium.

19. The method for manufacturing a disk-type recording medium as defined in claim 14, wherein upon separating the master information carrier and the disk-type recording medium, gas is compressed and blown in between the master information carrier and the disk-type recording medium while pressing the master information carrier toward the disk-type recording medium, and after the separation, said pressing is released.

20. The method for manufacturing a disk-type recording medium as defined in claim 10, wherein the master information carrier is subjected to suction and held by a master information carrier holder having a suction hole and a recess, wherein an inner diameter of the recess is almost the same as a diameter of a central hole of the disk-type recording medium.

21. A magnetic recording/reproducing device comprising a magnetic recording medium with pre-format recording signals made thereon by utilizing the method for manufacturing the magnetic recording medium as claimed in claim 1.

22. A hard disk drive comprising a magnetic recording medium on which a magnetic pattern used for pre-format recording is transferred and recorded on a magnetic film by the method for manufacturing the magnetic recording medium as claimed in claim 1.

23. The method for manufacturing a magnetic recording medium as defined in claim 6, wherein upon separating the master information carrier and the magnetic recording medium, gas is compressed and blown in between the master information carrier and the magnetic recording medium.

24. The method for manufacturing a magnetic recording medium as defined in claim 6, wherein upon separating the master information carrier and the magnetic recording medium, gas is compressed and blown in between the master information carrier and the magnetic recording medium while pressing the master information carrier toward the magnetic recording medium, and after the separation, said pressing is released.

25. The method for manufacturing a magnetic recording medium as defined in claim 2, wherein the master information carrier is subjected to suction and held by a master information carrier holder having a suction hole and a recess, wherein an inner diameter of the recess is almost the same as a diameter of a central hole of the magnetic recording medium.

26. The method for manufacturing a disk-type recording medium as defined in claim 2, wherein the master information carrier is a disk with no hole made thereon.

27. The method for manufacturing a disk-type recording medium as defined in claim 10, wherein the master information carrier is a disk with no hole made thereon.

28. The method for manufacturing a disk-type recording medium as defined in claim 11, wherein the master information carrier is a disk with no hole made thereon.

29. The method for manufacturing a disk-type recording medium as defined in claim 2, wherein the master information carrier is made of a silicon wafer.

30. The method for manufacturing a disk-type recording medium as defined in claim 10, wherein the master information carrier is made of a silicon wafer.

31. The method for manufacturing a disk-type recording medium as defined in claim 11, wherein the master information carrier is made of a silicon wafer.

32. The method for manufacturing a disk-type recording medium as defined in claim 15, wherein upon separating the master information carrier and the disk-type recording medium, gas is compressed and blown in between the master information carrier and the disk-type recording medium.

33. The method for manufacturing a disk-type recording medium as defined in claim 15, wherein upon separating the master information carrier and the disk-type recording medium, gas is compressed and blown in between the master information carrier and the disk-type recording medium while pressing the master information carrier toward the disk-type recording medium, and after the separation, said pressing is released.

34. The method for manufacturing a disk-type recording medium as defined in claim 15, wherein the master information carrier is subjected to suction and held by a master information carrier holder having a suction hole and a recess, wherein an inner diameter of the recess is almost the same as a diameter of a central hole of the disk-type recording medium.

35. A magnetic recording/reproducing device comprising a magnetic recording medium with pre-format recording signals made thereon by utilizing the method for manufacturing the magnetic recording medium as claimed in claim 2.

36. A hard disk drive comprising a magnetic recording medium on which a magnetic pattern used for pre-format recording is transferred and recorded on a magnetic film by the method for manufacturing the magnetic recording medium as claimed in claim 2.

37. The method for manufacturing a magnetic recording medium as defined in claim 1, wherein the master information carrier is dished to be concave with a high point in substantially a center of the master information carrier.

38. The method for manufacturing a magnetic recording medium as defined in claim 10, wherein the master information carrier is dished to be concave with a high point in substantially a center of the master information carrier.

39. An apparatus for transferring and recording information signals onto a magnetic recording medium comprising:

a holder operable to hold the magnetic recording medium;

a suction pad operable to hold a master information carrier having the information signals by subjecting the master information carrier to suction; and a magnetic head operable to transfer the information signals from the master information carrier onto the magnetic recording medium under a condition of stacking the master information carrier on the magnetic recording medium;

wherein the master information carrier is dished to be concave with a high point in substantially a center of the master information carrier.

40. The apparatus for transferring and recording information signals onto a magnetic recording medium as defined in claim 39, wherein said holder has a suction hole operable to subject a surface of the master information carrier to suction through a hole of the magnetic recording medium, the surface subjected to suction by said holder is a side opposite to that of a surface subjected to suction by said suction pad.

41. The method for manufacturing a magnetic recording medium as defined in claim 2, wherein the master information carrier is dished to be concave with a high point in substantially a center of the master information carrier.

42. The method for manufacturing a magnetic recording medium as defined in claim 11, wherein the master information carrier is dished to be concave with a high point in substantially a center of the master information carrier.

* * * * *